United States Patent
Kim

(10) Patent No.: US 9,569,855 B2
(45) Date of Patent: Feb. 14, 2017

(54) APPARATUS AND METHOD FOR EXTRACTING OBJECT OF INTEREST FROM IMAGE USING IMAGE MATTING BASED ON GLOBAL CONTRAST

(71) Applicant: Electronics and Telecommunications Research Institute, Daejeon (KR)

(72) Inventor: Jae-Hwan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/855,827

(22) Filed: Sep. 16, 2015

(65) Prior Publication Data
US 2016/0364877 A1   Dec. 15, 2016

(30) Foreign Application Priority Data
Jun. 15, 2015 (KR) .................. 10-2015-0084037

(51) Int. Cl.
G06K 9/00 (2006.01)
G06T 7/00 (2006.01)
G06T 5/30 (2006.01)
G06K 9/46 (2006.01)

(52) U.S. Cl.
CPC .......... *G06T 7/0081* (2013.01); *G06K 9/4671* (2013.01); *G06T 5/30* (2013.01); *G06T 7/004* (2013.01); *G06T 2207/10024* (2013.01); *G06T 2207/20024* (2013.01)

(58) Field of Classification Search
CPC .............. G06T 7/0081; G06T 2207/20144; G06K 9/4671; G06K 9/00234; G06K 9/4676
See application file for complete search history.

(56) References Cited

U.S. PATENT DOCUMENTS

| | | | |
|---|---|---|---|
| 2008/0304740 A1* | 12/2008 | Sun ................ | G06K 9/3233 382/168 |
| 2010/0302376 A1* | 12/2010 | Boulanger ........ | G06T 7/0081 348/164 |
| 2011/0038536 A1* | 2/2011 | Gong ............... | G06T 7/0081 382/164 |
| 2011/0150321 A1 | 6/2011 | Cheong et al. | |
| 2012/0148103 A1* | 6/2012 | Hampel ........... | G06K 9/00771 382/103 |
| 2013/0188070 A1 | 7/2013 | Lee et al. | |

FOREIGN PATENT DOCUMENTS

KR   10-2010-0072844 B2   7/2010
KR   10-1384627 B1        4/2014

\* cited by examiner

*Primary Examiner* — Eueng-Nan Yeh
(74) *Attorney, Agent, or Firm* — Nelson Mullins Riley & Scarborough LLP; Anthony A. Laurentano

(57) ABSTRACT

An apparatus and method for extracting an object of interest from an image using image matting are disclosed herein. The apparatus for extracting an object of interest from an image using image matting includes a saliency map generation unit, a trimap generation unit, and an alpha map generation unit. The saliency map generation unit generates a saliency map corresponding to an object of interest inside an input image using a color space probability distribution corresponding to the input image. The trimap generation unit generates meta-trimaps using filters, and generates a trimap by clustering the meta-trimaps. The alpha map generation unit generates an alpha map using the trimap and a matting Laplacian matrix, and extracts the object of interest based on image matting using the alpha map and the input image.

20 Claims, 16 Drawing Sheets

| MetaTri-Map For GB Image | MetaTri-Map For DE Image | Final Tri-Map |
|---|---|---|
| F | F | F |
| F | B | F |
| F | E | F |
| B | F | F |
| B | B | B |
| B | E | E |
| E | F | F |
| E | B | E |
| E | E | E |

FIG. 5

Map<string, Image> : <ORIGINAL FILE NAME, ORIGINAL IMAGE>
Map<string, Image> : <SALIENCY MAP FILE NAME, SALIENCY MAP IMAGE>
Map<string, Image> : <FILTERED SALIENCY MAP FILE NAME, FILTERED SALIENCY MAP IMAGE>
Map<string, Image> : <TRIMAP FILE NAME, TRIMAP IMAGE>
Map<string, Char*> : <CHANGED TRIMAP FILE NAME, CHANGED TRIMAP DATA>
Map<string, Image> : <ALPHA MAP FILE NAME, ALPHA MAP IMAGE>
Map<string, Image> : <OBJECT-OF-INTEREST EXTRACTION FILE NAME, OBJECT-OF-INTEREST EXTRACTION IMAGE>

APPARATUS AND METHOD FOR EXTRACTING OBJECT OF INTEREST FROM IMAGE USING IMAGE MATTING BASED ON GLOBAL CONTRAST

CROSS-REFERENCE TO RELATED APPLICATION

This application claims priority to and the benefit of Korean Patent Application No. 10-2015-0084037, filed Jun. 15, 2015, which is hereby incorporated by reference herein in its entirety.

BACKGROUND

1. Technical Field

An embodiment of the present invention relates generally to a technology for extracting an object of interest from an image and, more particularly, to a technology for extracting an object of interest from an image using a saliency map, a trimap, and an alpha map.

2. Description of the Related Art

Technology for automatically segmenting and extracting an object inside image content is an issue that is considered to be of great importance in the field of computer vision. Technology for automatically segmenting and extracting an object inside image content corresponds to a core module for performing application services, such as object-of-interest image segmentation, object recognition, object annotation, adaptive image compression, image retrieval, image-based content creation (e.g., image synthesis and non-realistic rendering). However, a corresponding problem is an intrinsically ill-posed problem, and requires additional constraint conditions in order to obtain a stable solution (i.e., a precisely segmented and extracted object-of-interest region). The additional constraint conditions are provided in the form of the input of preliminary information by a user (e.g., the user labeling of pixels having clear information) or in the form of the random assumption of a color model (e.g., a linear color model, a Gaussian mixture model, or the like).

In particular, an object extraction method for the object recognition, object annotation and image search of the aforementioned application services tends to chiefly depend on a conventional method of performing detection by scanning rectangular sliding windows. This method presents a difficulty in providing accurate spatial support for an object of interest (i.e., a subregion including a target object). That is, in order to provide accurate spatial support for an object and guarantee the high performance of related application services, an object of interest, not an approximate region of interest, needs to be precisely extracted.

Furthermore, there is a need for an improved method for automation because it is practically impossible for a user to set each constraint in many application services using a variety of large-scale images.

Most image segmentation and abstraction technologies correspond to region grouping based on an image color distribution. These image segmentation and abstraction technologies have a limitation in that they have different region group labels (i.e., the indices of subregions distinguished by exclusive labels) even within a specific object of interest, and have a problem in that they obtain coarse segmentation results attributable to the inaccuracy of an edge between different regions that are spatially close to each other.

Furthermore, in accurate image object extraction, an object is precisely extracted by probabilistically calculating a transparency (opacity or alpha matte) value between a specific object region and other regions using a method called image matting. However, this has a limitation in that preliminary information (i.e., a preliminary information map in which foreground and background labels are specified for some pixels inside an image in a trimap or scramble form) is required simultaneously with the input of an original image (chiefly by a user).

Korean Patent No. 1384627 discloses a technology for rapidly segmenting an object, including a flower, in an image using a probability distribution estimation algorithm.

However, Korean Patent No. 1384627 has a disadvantage in that a spatial distribution for color that can more precisely be segmented is not used in the segmentation of an object inside an image.

Therefore, in light of the recent explosive spread of 3D content, there is a need for a technology that is capable of precisely and automatically extracting an object of interest from an image.

SUMMARY

At least one embodiment of the present invention is directed to the automatic extraction of an object of interest based on the principle that elements within similar regions analyzed from a cognitive perspective have similar saliency map and alpha map values.

At least one embodiment of the present invention is directed to a more precise extraction of an object of interest based on transparency alpha values between the object of interest and a background using an alpha map.

In accordance with an aspect of the present invention, there is provided an apparatus for extracting an object of interest from an image using image matting, including: a saliency map generation unit configured to generate a saliency map corresponding to an object of interest inside an input image using a color space probability distribution corresponding to the input image; a trimap generation unit configured to generate meta-trimaps using filters and generate a trimap by clustering the meta-trimaps; and an alpha map generation unit configured to generate an alpha map using the trimap and a matting Laplacian matrix and extract the object of interest based on image matting using the alpha map and the input image.

The saliency map generation unit may include: a color segmentation unit configured to perform Gaussian mixture model (GMM)-based color segmentation on the input image and store segmented subregions in a binary tree; a probability distribution generation unit configured to generate the color space probability distribution based on an image labeled with pixel values corresponding to the input image; and a generation unit configured to generate the saliency map using a probability value calculated based on the color space probability distribution and a space variance.

The generation unit may calculate the space variance using the following equation:

$$\mathrm{Var}(z_{pos}|c) = \frac{1}{|c|_c}\sum_z P(c|I_z)\cdot |z_{pos} - M(z_{pos}|c)|^2$$

where $\mathrm{Var}(z_{pos}|c)$ is a space variance, c is a GMM element, $I_z$ is a pixel color, $P(c|I_z)$ is a probability that the pixel color $I_z$ will be included in the GMM element c, $M(z_{pos}|c)$ is a space mean and $z_{pos}$ is a position of pixel z within the GMM element c, z is a pixel, and $\sum_z$ is a total sum of $P(c|Iz) \cdot |z_{pos} - M(z_{pos}|c)|^2$ corresponding to z.

The trimap generation unit may include: a meta-trimap generation unit configured to generate two meta-trimaps from the saliency map using the two filters; a clustering unit configured to cluster the meta-trimaps into a foreground region, a background region, and an unknown region; and a generation unit configured to generate the trimap by integrating the clustered meta-trimaps.

The meta-trimap generation unit may generate the two meta-trimaps using a Gaussian blur filter and a dilation and erosion filter.

The clustering unit may assign the same value to all pixels within a clustered group present in each of the meta-trimaps.

The clustering unit may assign the color average value of the values of all the pixels within the group to all the pixels.

The alpha map generation unit may include: a matting Laplacian matrix calculation unit configured to calculate the matting Laplacian matrix into which color distances between all pixels inside the image have been incorporated; a generation unit configured to calculate the transparent values of pixels using the matting Laplacian matrix and the trimap and generate the alpha map based on the transparent values; and an object extraction unit configured to extract the object of interest based on the image matting using the alpha map and the image.

The matting Laplacian matrix calculation unit may convert the matting Laplacian matrix into a sparse matrix, and may store the sparse matrix.

The object extraction unit may extract the object of interest based on a foreground region, a background region, and a linear combination relationship between transparency alpha values corresponding to the alpha map.

In accordance with another aspect of the present invention, there is provided a method for extracting an object of interest from an image using image matting, including: generating a saliency map corresponding to an object of interest inside an input image using a color space probability distribution corresponding to the input image; generating meta-trimaps corresponding to the saliency map using filters, and generating a trimap by clustering the meta-trimaps; and generating an alpha map using the trimap and a matting Laplacian matrix, and extracting the object of interest based on image matting using the alpha map and the input image.

Generating the saliency map may include: performing Gaussian mixture model (GMM)-based color segmentation on the input image, and storing segmented subregions in a binary tree; generating the color space probability distribution based on an image labeled with pixel values corresponding to the input image; and generating the saliency map using a probability value calculated based on the color space probability distribution and a space variance.

Generating the saliency map may include calculating the space variance using the following equation:

$$\mathrm{Var}(z_{pos}|c) = \frac{1}{|c|_c} \sum_z P(c|I_z) \cdot |z_{pos} - M(z_{pos}|c)|^2$$

where $\mathrm{Var}(z_{pos}|c)$ is a space variance, c is a GMM element, $I_z$ is a pixel color, $P(c|I_z)$ is a probability that the pixel color $I_z$ will be included in the GMM element c, $M(z_{pos}|c)$ is a space mean and $z_{pos}$ is a position of pixel z within the GMM element c, z is a pixel, and $\sum_z$ is a total sum of $P(c|I_z) \cdot |z_{pos} - M(z_{pos}|c)|^2$ corresponding to z.

Generating the trimap may include: generating two meta-trimaps from the saliency map using the two filters; clustering the meta-trimaps into a foreground region, a background region, and an unknown region; and generating the trimap by integrating the clustered meta-trimaps.

Generating the meta-trimap may include generating the two meta-trimaps using a Gaussian blur filter and a dilation and erosion filter.

Clustering the meta-trimaps may include assigning the same value to all pixels within a group present in each of the meta-trimaps.

Clustering the meta-trimaps may include assigning the color average value of the values of all the pixels within the group to all the pixels.

Generating the alpha map may include: calculating the matting Laplacian matrix into which color distances between all pixels inside the image have been incorporated; calculating the transparent values of pixels using the matting Laplacian matrix and the trimap, and generating the alpha map based on the transparent values; and extracting the object of interest based on the image matting using the alpha map and the image.

Calculating the matting Laplacian matrix may include converting the matting Laplacian matrix into a sparse matrix, and storing the sparse matrix.

Extracting the object may include extracting the object of interest based on a foreground region, a background region, and a linear combination relationship between transparency alpha values corresponding to the alpha map.

BRIEF DESCRIPTION OF THE DRAWINGS

The above and other objects, features and advantages of the present invention will be more clearly understood from the following detailed description taken in conjunction with the accompanying drawings, in which:

FIG. 5 is a table showing a rule in which meta-trimaps are integrated in an apparatus for extracting an object of interest from an image using image matting based on global contrast according to an embodiment of the present invention;

FIG. 11 is a diagram showing an embodiment of a type in which metadata generated by an apparatus for extracting an object of interest from an image using image matting based on global contrast according to an embodiment of the present invention are stored;

DETAILED DESCRIPTION

Figure 1:
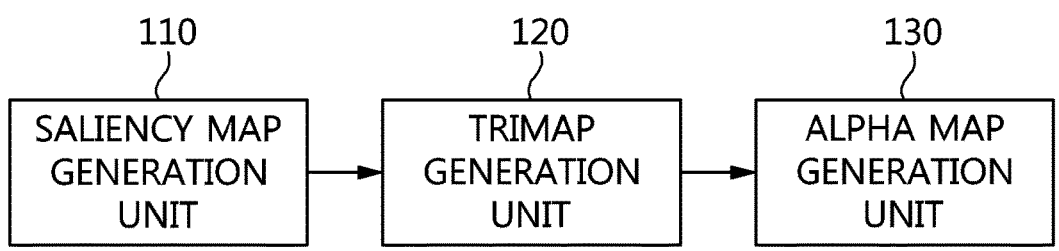
FIG. 1 is a block diagram showing an apparatus for extracting an object of interest from an image using image matting based on global contrast according to an embodiment of the present invention.

The present invention will be described in detail below with reference to the accompanying drawings. Redundant descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

Embodiments of the present invention are described in detail below with reference to the accompanying drawings.

FIG. 1 is a block diagram showing an apparatus for extracting an object of interest from an image using image matting based on global contrast according to an embodiment of the present invention.

Referring to FIG. 1, the apparatus for extracting an object of interest from an image using image matting based on global contrast according to the present embodiment includes a saliency map generation unit 110, a trimap generation unit 120, and an alpha map generation unit 130.

The saliency map generation unit 110 generates a saliency map corresponding to an object of interest inside an input image using a color space probability distribution corresponding to the input image.

In this case, the saliency map corresponds to the extraction of a region or object from an image that is biologically viewed by the eyes of a human first.

In this case, the saliency map generation unit 110 performs Gaussian mixture model (GMM)-based color segmentation on the input image, and generates a color space probability distribution based on the image labeled with pixel values.

In this case, subregions that are generated when the saliency map generation unit 110 performs the color segmentation may be stored in binary tree leaf nodes.

In this case, the saliency map generation unit 110 may generate the saliency map using a probability value measured based on the color space probability distribution and a space variance, and a detailed description thereof will be given with reference to FIG. 2.

The trimap generation unit 120 generates meta-trimaps using filters, and generates a trimap by clustering the meta-trimaps.

In this case, the filters that are used by the trimap generation unit 120 may include a Gaussian blur filter and a dilation and erosion filter.

In this case, the Gaussian filter may be used to convert the hard edge of a saliency map into the soft edge thereof and to more precisely calculate the transparency alpha value of an edge between an object-of-interest region and an background region calculated by the alpha map generation unit 130.

In this case, the dilation and erosion filter may be used to more accurately calculate a transparency alpha value within an object-of-interest region calculated by the alpha map generation unit 130 by further increasing density within the object of interest. For example, in the case of an object of interest in which a large hole is present at the center of the object of interest, it is difficult to determine an object to be the region of an object of interest because there is a great difference between the color of the object, other than the hole, and the color of the hole, but the object may be corrected when a trimap is generated using the dilation and erosion filter.

In this case, the meta-trimap may be a result that is obtained by performing image processing on the saliency map.

In this case, the trimap generation unit 120 clusters the meta-trimaps into a foreground region, a background region, and an unknown region.

In this case, the foreground region refers to a region in which the object of interest is present. The background region refers to a region in which the object of interest is not present. The unknown region refers to a region in which whether an object of interest is present cannot be determined.

In this case, when the meta-trimaps are clustered into the three regions, a graph segmentation method may be used.

In this case, the same value may be assigned to all pixels within each of the clustered regions. For example, the average value of the values of all the pixels may be assigned to pixels within the foreground region.

In this case, a trimap may be formed by integrating clustered meta-trimaps, and a detailed description thereof will be given with reference to FIGS. 5 to 10.

The alpha map generation unit 130 generates an alpha map using a trimap and a matting Laplacian matrix, and extracts an object of interest based on image matting using the alpha map and the image.

In this case, the alpha map refers to data other than three colors (R, G, and B) processed by a computer. When the color of one pixel is displayed in the state of overlapping the color of another pixel, the alpha map may be used to effectively merge the two colors. In an embodiment of the present invention, the value of a probability of being included in a foreground region versus a background region within an unknown region inside an image is assigned as a transparency value, and the alpha map refers to an image showing such a transparency value. A detailed description thereof will be given with reference to FIG. 10.

In this case, the image matting refers to a technology for comparing two or more images, removing a background region from an original image, and displaying only the foreground region. The alpha map generation unit 130 may extract the object of interest based on image matting using the alpha map and the original image.

In this case, the alpha map generation unit 130 may generate the alpha map using a matting Laplacian matrix, into which color distances between all the pixels in the image have been incorporated, and an alpha map. This will be described in detail with reference to FIG. 4.

Figure 2:
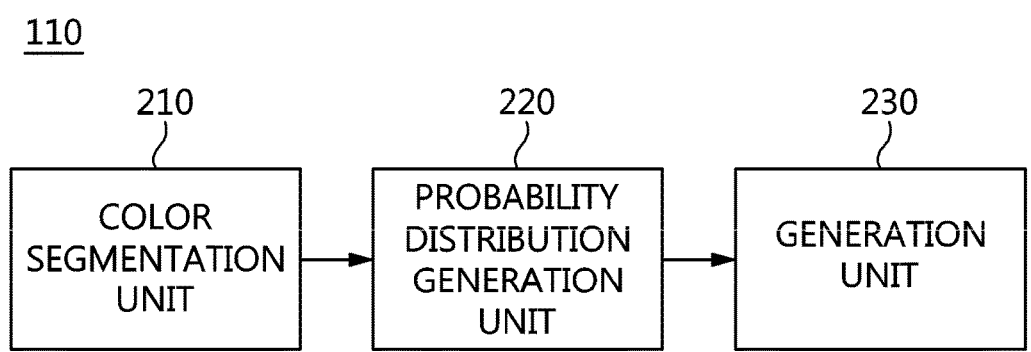
FIG. 2 is a block diagram showing an embodiment of the saliency map generation unit shown in FIG. 1.

FIG. 2 is a block diagram showing an embodiment of the saliency map generation unit shown in FIG. 1.

Referring to FIG. 2, the saliency map generation unit 110 includes a color segmentation unit 210, a probability distribution generation unit 220, and a generation unit 230.

The color segmentation unit 210 performs GMM-based color segmentation on an input image, and stores segmented subregions in a binary tree.

In this case, the color segmentation unit 210 may recursively perform segmentation from a single image on the assumption that subregions having smaller color variance values correspond to a well segmented group. The segmented subregions may be stored in binary tree leaf nodes.

The probability distribution generation unit 220 generates a color space probability distribution based on an image labeled with a pixel value corresponding to an image.

In this case, the color space probability distribution may refer to a distribution that is obtained using a center average distance and a variance between subregions, having different colors, as momentum.

In this case, color space variance momentum for a pixel $z_{pos}$ within a GMM element c in the color space probability distribution may be calculated using Equations 1 and 2:

$$M(z_{pos}|c) = \frac{1}{|c|_c} \sum_z P(c|I_z) \cdot z_{pos} \quad (1)$$

where M ($z_{pos}$|c) is a space mean, P(c|$I_z$) is a probability that a pixel color $I_z$ will be included in the GMM element c, and $z_{pos}$ is the pixel within the GMM element c.

$$\mathrm{Var}(z_{pos}|c) = \frac{1}{|c|_c} \sum_z P(c|I_z) \cdot |z_{pos} - M(z_{pos}|c)|^2 \quad (2)$$

where Var($z_{pos}$|c) is a space variance, M($z_{pos}$|c) is a space mean, P(c|$I_z$) is a probability that a pixel color $I_z$ will be included in the GMM element c and $z_{pos}$ is a position of pixel z within the GMM element c, z is a pixel, and $\sum_z$ is a total sum of P(c|$I_z$)·|$z_{pos}$−M($z_{pos}$|c)|² corresponding to z.

$$P(c|I_z) = \frac{w_c N(I_z | \mu_c, \Xi_c)}{\sum_c w_c N(I_z | \mu_c, \Xi_c)} \quad (3)$$

where P(c|$I_z$) is a probability that the pixel color $I_z$ will be included in the GMM element c, and $I_z$ is the pixel color.

The generation unit 230 generates a saliency map using a probability value calculated based on the color space probability distribution and a space variance.

In this case, the saliency map may be a white and black single channel image.

In this case, the generation unit 230 may assign a probability value weighted with the space variance value generated by the probability distribution generation unit 220, and may generate a saliency map.

In this case, in the probability value weighted with the space variance value, the space variance value may be weighted in order to put emphasis on a more important region from a viewpoint in which a region having a small color variance has been well segmented and may be well viewed by a person.

Figure 3:
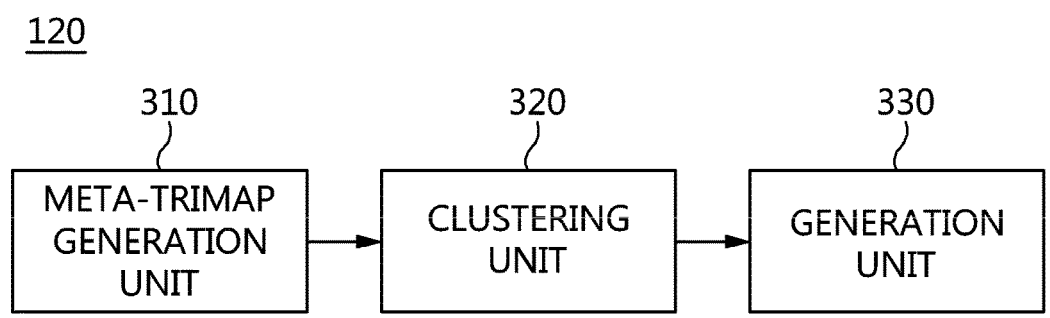
FIG. 3 is a block diagram showing an embodiment of the trimap generation unit shown in FIG. 1.

FIG. 3 is a block diagram showing an embodiment of the trimap generation unit shown in FIG. 1.

Referring to FIG. 3, the trimap generation unit 120 includes a meta-trimap generation unit 310, a clustering unit 320, and a generation unit 330.

The meta-trimap generation unit 310 generates two meta-trimaps from a saliency map using two filters.

In this case, the meta-trimap may be a name that commonly refers to a map generated in the middle of the process of generating the trimaps from the saliency map.

In this case, the filters used by the meta-trimap generation unit 310 may include a Gaussian blur filter and a dilation and erosion filter.

In this case, the Gaussian filter may be used to convert the hard edge of a saliency map into the soft edge thereof and to more precisely calculate the transparency alpha value of an edge between an object-of-interest region and a background region calculated by the alpha map generation unit 130.

In this case, the dilation and erosion filter may be used to more accurately calculate a transparency alpha value within an object-of-interest region calculated by the alpha map generation unit 130 by further increasing density within the object of interest. For example, in the case of an object of interest in which a large hole is present at the center of the object of interest, it is difficult to determine an object to be the region of an object of interest because there is a great difference between the color of the object, other than the hole, and the color of the hole, but the object may be corrected when a trimap is generated using the dilation and erosion filter The clustering unit 320 clusters the meta-trimaps into a foreground region, a background region, and an unknown region.

In this case, the foreground region refers to a region in which an object of interest is present. The background region refers to a region in which an object of interest is not present. The unknown region refers to a region in which whether an object of interest is present cannot be determined.

In this case, when the meta-trimaps are clustered into the three regions, a graph segmentation method may be used.

In this case, the same value may be assigned to all pixels within each of the clustered regions. For example, the average value of the values of all the pixels may be assigned to pixels within the foreground region.

The generation unit 330 generates a trimap by integrating the clustered meta-trimaps.

In this case, the generation unit 330 generates the trimap by integrating two meta-trimaps generated by the clustering unit 320.

In this case, a method of synthesizing each of a foreground region (indicated by F), a background region (indicated by B) and an unknown region (indicated by E) included in the two meta-trimaps will be described with reference to FIGS. 5 to 10.

Figure 4:
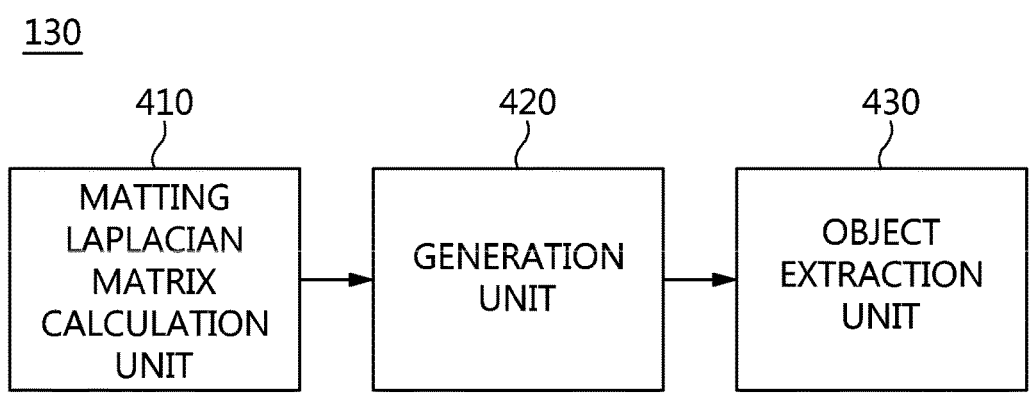
FIG. 4 is a block diagram showing an embodiment of the alpha map generation unit shown in FIG. 1.

FIG. 4 is a block diagram showing an embodiment of the alpha map generation unit 130 shown in FIG. 1.

Referring to FIG. 4, the alpha map generation unit 130 includes a matting Laplacian matrix calculation unit 410, a generation unit 420, and an object extraction unit 430.

The matting Laplacian matrix calculation unit 410 calculates a similarity matrix, into which color distances between all pixels inside an image have been incorporated, and generates a Laplacian matrix based on the similarity matrix.

In this case, the similarity matrix is a matrix into which the color distances between all pixels inside an image have been incorporated, and may represent a relationship between pixels, i.e., similar color distances.

In this case, the similarity matrix may be calculated using Equation 4:

$$A = \sum_{pos(x,y) \in w_p} \frac{1}{|w_p|}\left(1 + (I_x - \mu_k)\left(\Xi_k + \frac{\varepsilon}{|w_p|}I\right)^{-1}(I_y - \mu_k)\right) \quad (4)$$

where $|w_p|$ is the number of pixels within a window, $w_p$ is a local window in a pixel p, and $\mu_k$ is the average value of pixels within the window.

In this case, the matting Laplacian matrix may be calculated based on the similarity matrix:

$$L = \Sigma_j A_{ij} - A \quad (5)$$

where L is the matting Laplacian matrix, A is the similarity matrix, and $A_{ij}$ is an element corresponding to an i-th row and an j-th column within the similarity matrix A.

In this case, the reason why the matting Laplacian matrix is calculated is to generate a sparse matrix because the size of a similarity matrix increases in the case of a high-resolution image and thus there occurs a problem with the storage and transmission of data.

The generation unit 420 calculates the transparent values of pixels using the matting Laplacian matrix and the trimap, and generates an alpha map based on the transparent values.

In this case, the alpha map refers data other than three colors (R, G, and B) processed by a computer. If the color of one pixel is displayed in the state of overlapping the color of another pixel, the alpha map may be used to effectively merge the two colors. In an embodiment of the present invention, the value of a probability of being included in a foreground region versus a background region within an unknown region inside an image is assigned as a transparency value, and the alpha map refers to an image showing such a transparency value.

In this case, the generation of the alpha map may mean that a probability value to be included in a foreground region versus a background region with respect to all pixels in the unknown region within an image based on Laplacian matting and a trimap is calculated and a map is formed based on the probability value.

The object extraction unit 430 extracts an object of interest using image matting based on the alpha map and the image.

In this case, the image matting refers to a technology for comparing two or more images, removing a background region from an original image, and displaying only a foreground region. The object extraction unit 430 may extract the object of interest using the image matting using the alpha map and the original image.

In this case, the object extraction unit 430 may separate the foreground region and the background region from the unknown region within the image, and may extract a region, in which a previously extracted foreground region and the foreground region in the unknown region within the image have been added, as the object of interest.

In this case, when the object extraction unit 430 extracts the foreground region from the unknown region within the image, the foreground region F and the remaining background region B corresponding to the object of interest in the original image may be extracted on the assumption that there is a linear combination relationship weighted with a transparency alpha value cc.

In this case, in the foreground region F and the remaining background region B corresponding to the object of interest within the original image, the weighted linear combination relationship of the transparency alpha value cc may be represented by Equation 6:

$$I = \alpha F + (1-\alpha)B \quad (6)$$

where F is the foreground region, B is the background region, and I is a constant.

In this case, Equation 6 means that a probability that pixels within an image correspond to the background region decreases as a probability that the pixels within the image correspond to the foreground region increases. Equation 6 shows the relationship in which the foreground region, the background region, and the transparency alpha value have been linearly combined.

FIG. 5 is a table showing a rule in which meta-trimaps are integrated in an apparatus for extracting an object of interest from an image using image matting based on global contrast according to an embodiment of the present invention, and FIGS. 6 to 9 are diagrams showing an embodiment in which meta-trimaps are integrated in an apparatus for extracting an object of interest from an image using image matting based on global contrast according to an embodiment of the present invention.

A process of generating a trimap by integrating meta-trimaps is described below with reference to FIGS. 5 to 9.

Referring to FIG. 5, the foreground region of an object of interest is indicated by F, the background region thereof is indicated by B, and the unknown region thereof is indicated by E.

Figure 6:
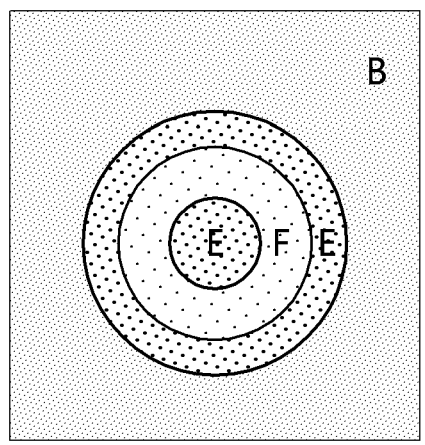
FIGS. 6 to 9 are diagrams showing an embodiment in which meta-trimaps are integrated in an apparatus for extracting an object of interest from an image using image matting based on global contrast according to an embodiment of the present invention.
Figure 7:
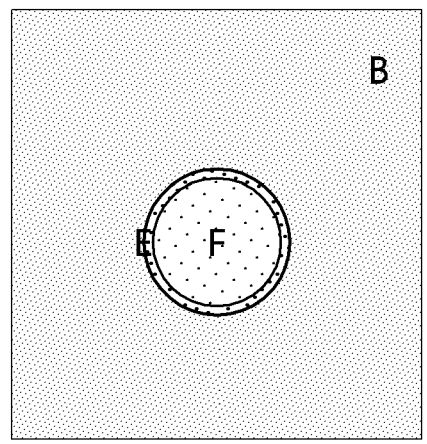

First, the results of clustering two meta-trimaps, generated by the meta-trimap generation unit 310 using a Gaussian blur filter GB and a dilation and erosion filter (DE), into the foreground region, the background region, and the unknown region by the clustering unit 320 are shown in FIGS. 6 and 7.

Figure 8:
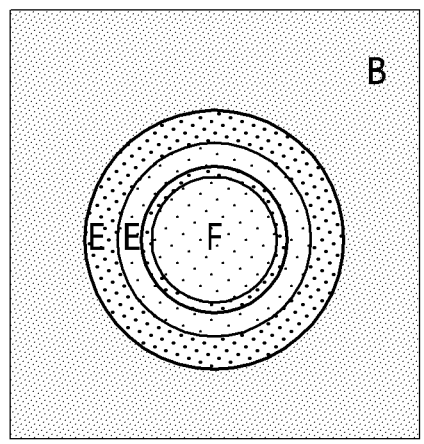
Figure 9:
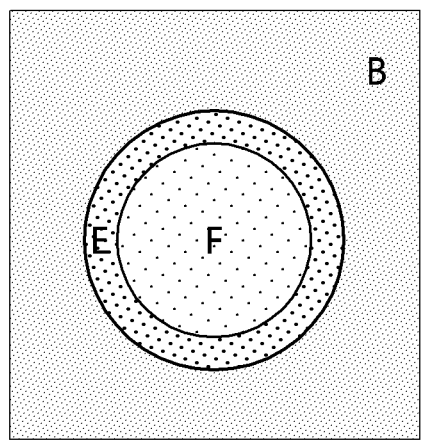

It can be seen that FIG. 8 is generated by integrating FIGS. 6 and 7 using the table shown in FIG. 5.

It can be seen that F, E, F, E, and B are shown in order of the closeness of regions to the center of a circle shown in FIG. 8.

In this case, it can be seen by checking the results of integrating E shown in a meta-trimap generated using the Gaussian blur GB with F shown in a meta-trimap generated using the dilation and erosion filter (DE) in FIG. 5 that F is generated.

In this case, it can be seen by checking the results of integrating E shown in the meta-trimap generated using the GB with B shown in the meta-trimap generated using the DE in FIG. 5 that E is generated.

The results of integrating two meta-trimaps as described above are shown in FIG. 10.

Figure 10:
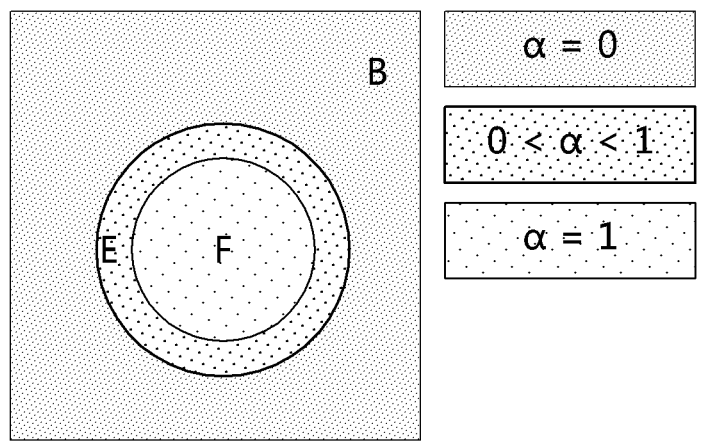
FIG. 10 is a diagram showing transparency alpha values in the alpha map generation unit of an apparatus for extracting an object of interest from an image using image matting based on global contrast according to an embodiment of the present invention.

FIG. 10 is a diagram showing transparency alpha values in the alpha map generation unit of an apparatus for extracting an object of interest from an image using image matting based on global contrast according to an embodiment of the present invention.

Referring to FIG. 10, a transparency alpha value a is a value larger than 0 and equal to or smaller than 1, and refers to a probability value on which all pixels within an unknown region inside an image will be included in a foreground region versus a background region.

In this case, a transparency alpha value corresponding to the foreground region may be set to 1, and a transparency alpha value corresponding to the background region may be set to 0.

In this case, a transparency alpha value corresponding to the unknown region may be between 0 and 1. As the transparency alpha value becomes close to 1, a region may be viewed as being close to the foreground region. As the transparency alpha value becomes close to 0, a region may be viewed as being close to the foreground region.

In this case, the transparency alpha value corresponding to the unknown region may be calculated based on a matting Laplacian matrix and a trimap.

In this case, when the object extraction unit 430 extracts the foreground region from the unknown region within the image, the foreground region F and the remaining background region B corresponding to an object of interest within the original image may be extracted on the assumption that there is a linear combination relationship weighted with the transparency alpha value α.

In this case, in the foreground region F and the remaining background region B corresponding to the object of interest within the original image, the linear combination relationship weighted with the transparency alpha value cc may be expressed by Equation 6:

$$I=\alpha F+(1-\alpha)B \quad (6)$$

where F is the foreground region, B is the background region, and I is a constant.

Equation 6 means that a probability that pixels within an image correspond to the background region decreases as a probability that the pixels within the image correspond to the foreground region increases. Equation 6 shows the relationship in which the foreground region, the background region, and the transparency alpha value have been linearly combined.

FIG. 11 is a diagram showing an embodiment of a type in which metadata generated by an apparatus for extracting an object of interest from an image using image matting based on global contrast according to an embodiment of the present invention is stored.

Referring to FIG. 11, in an embodiment of the present invention, many metadata may be formed by the saliency map generation unit 110, the trimap generation unit 120, and the alpha map generation unit 130. Many pieces of metadata may be generated in the case of a high-quality image.

In this case, in order to efficiently manage many pieces of metadata, multi-equilibrium binary tree container structures capable of supporting easy access and high-speed search may be used.

In this case, the metadata may be stored in a multi-equilibrium binary tree container in the form of <KEY, VALUE>.

In this case, KEY may refer to the unique ID of each non-redundant metadata.

In this case, VALUE may refer to data corresponding to each piece of metadata.

FIG. 11 shows an example in which metadata is stored in the form of <KEY, VALUE>.

Figure 12:
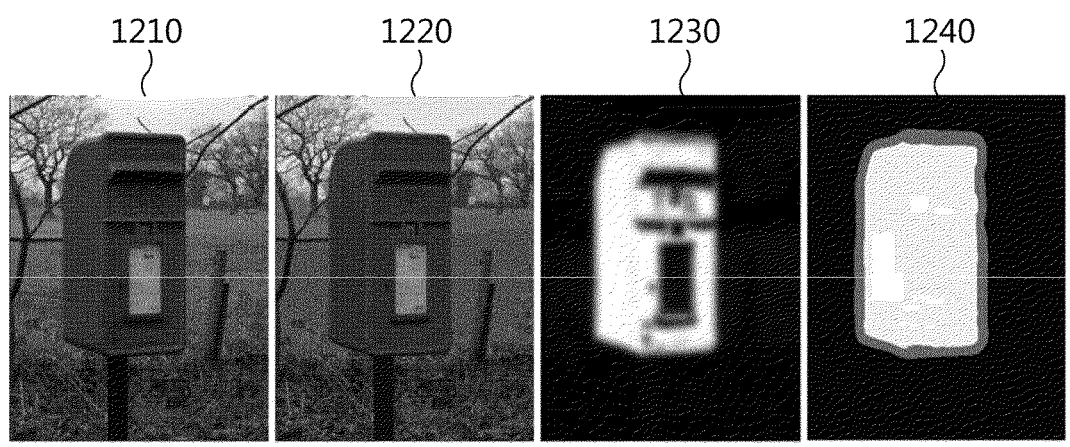
FIG. 12 is a diagram showing an example in which an object of interest is extracted using an apparatus for extracting an object of interest from an image using image matting based on global contrast according to an embodiment of the present invention.

FIG. 12 is a diagram showing an example in which an object of interest is extracted using an apparatus for extracting an object of interest from an image using image matting based on global contrast according to an embodiment of the present invention.

Referring to FIG. 12, an original image 1210, a quantized image 1220 generated by the saliency map generation unit 110, a filtered saliency map 1230 generated by the trimap generation unit 120, and a clustered trimap 1240 are shown.

Figure 13:
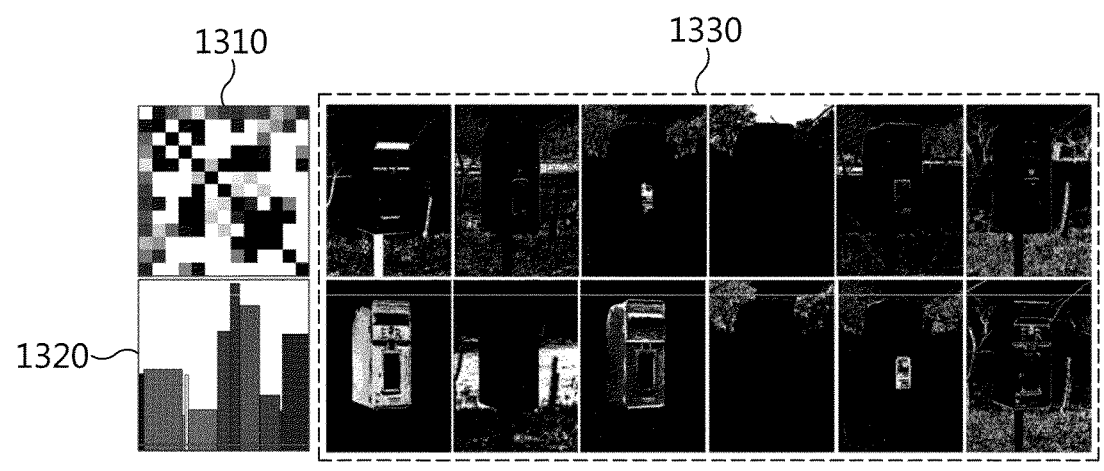
FIG. 13 is a diagram showing a color space probability distribution generated by a saliency map generation unit in the extraction of an object of interest shown in FIG. 12.

FIG. 13 is a diagram showing a color space probability distribution generated by the saliency map generation unit in the extraction of the object of interest shown in FIG. 12.

FIG. 13 includes the result 1330 of the execution of GMM-based color segmentation using the original image 1210 shown in FIG. 12, a result 1320 indicating the relationship between average color elements, generated by generating the color space variance of the image on which color segmentation has been performed, in the form of a matrix, and a histogram 1310 between the average color elements.

In this case, in the histogram 1310 between the average color elements, an X axis may indicate the degree of a variance between the average color elements, and a Y axis may indicate the ratio of corresponding average color elements to an overall GMM.

In this case, when the result 1320 shown in the form of a matrix is analyzed, it can be seen that the first, third, and eleventh bright regions and a seventh red subregion have different colors but exhibit a close relationship for the space of the same object of interest.

In this case, it can be seen that the variance of the first, third, and eleventh elements and seventh element group is smaller than that of other groups. This is a result indicating that a region having the smallest space variance is an important region that has been abstracted compared to other regions.

Figure 14:
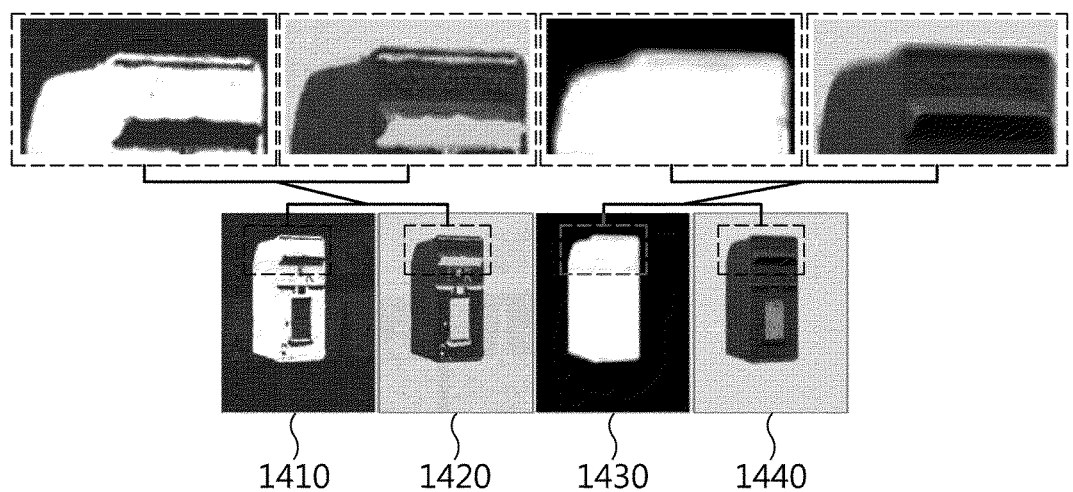
FIG. 14 is a diagram showing the results of the extraction of an object of interest using only contrast and the results of the extraction of an object of interest according to an embodiment of the present invention.

FIG. 14 is a diagram showing the results of the extraction of an object of interest using only contrast and the results of the extraction of an object of interest according to an embodiment of the present invention.

FIG. 14 shows the results 1410 and 1420 of the extraction of an interest region using only existing contrast and the results 1430 and 1440 of the extraction of an interest region according to an embodiment of the present invention.

When the alpha map 1410 generated using only existing contrast is compared with the alpha map 1430 generated using an apparatus for extracting an object of interest from an image using image matting based on global contrast according to an embodiment of the present invention, it can be seen that the alpha map 1430 has been more precisely generated than the alpha map 1410.

When the results 1420 of the extraction of the interest region are compared with the results 1440 of the extraction of the interest region, it can be seen that the interest region 1440 extracted using the apparatus for extracting an object of interest from an image using image matting based on global contrast according to the embodiment of the present invention is more precise.

Figure 15:
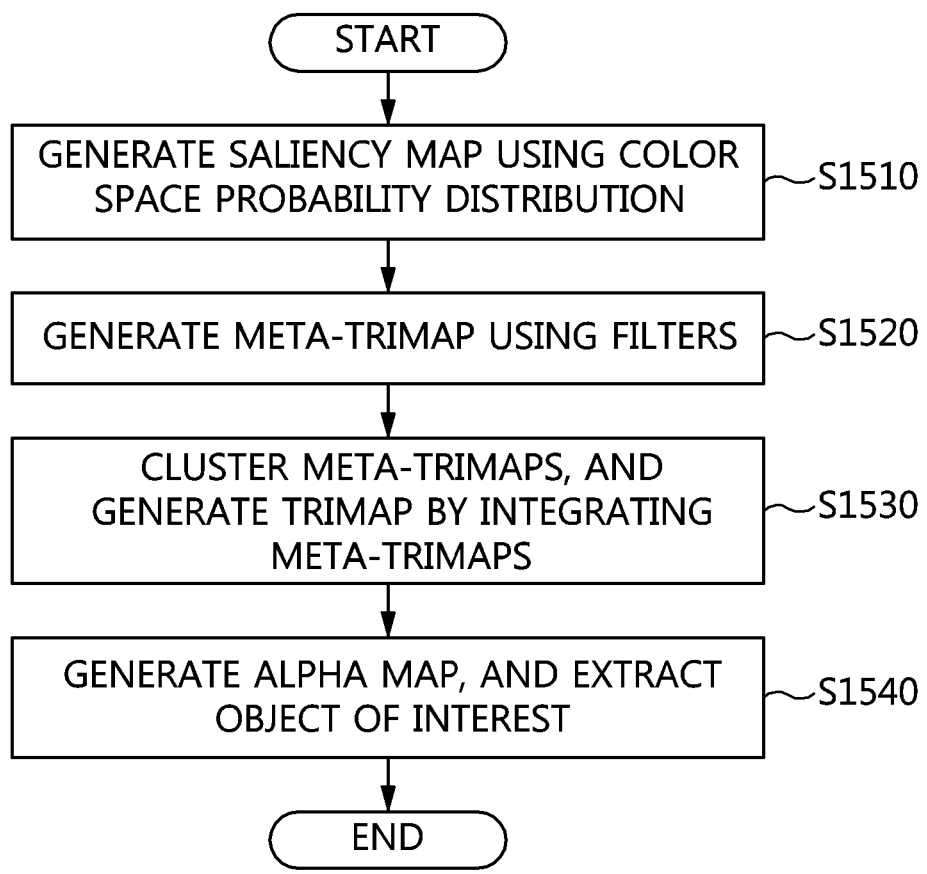
FIG. 15 is an operation flowchart showing a method for extracting an object of interest from an image using image matting based on global contrast according to an embodiment of the present invention.

FIG. 15 is an operation flowchart showing a method for extracting an object of interest from an image using image matting based on global contrast according to an embodiment of the present invention.

Referring to FIG. 15, first, a saliency map is generated using a color space probability distribution at step S1510.

In this case, the saliency map corresponds to the extraction of a region or object from an input image that is biologically viewed by the eyes of a human first.

In this case, Gaussian mixture model (GMM)-based color segmentation is performed on the input image, and the color space probability distribution is generated based on the image labeled with pixel values.

In this case, subregions that are generated when the color segmentation is performed may be stored in binary tree leaf nodes.

In this case, the saliency map may be generated using a probability value measured based on the color space probability distribution and a space variance.

Furthermore, meta-trimaps are generated using filters at step S1520.

In this case, the filters that are used to generate the meta-trimaps may include a Gaussian blur filter and a dilation and erosion filter.

In this case, the Gaussian filter may be used to convert the hard edge of a saliency map into the soft edge thereof and to more precisely calculate the transparency alpha value of an edge between an object-of-interest region and background region calculated by the alpha map generation unit 130.

In this case, the dilation and erosion filter may be used to more accurately calculate a transparency alpha value within an object-of-interest region calculated by the alpha map generation unit 130 by further increasing density within the object of interest. For example, in the case of an object of interest in which a large hole is present at the center of the object of interest, it is difficult to determine an object to be the region of an object of interest because there is a great difference between the color of the object, other than the hole, and the color of the hole, but the object may be corrected when a trimap is generated using the dilation and erosion filter.

In this case, the meta-trimap may be a result that is obtained by performing image processing on the saliency map.

Furthermore, the meta-trimaps are clustered, and a trimap is generated by integrating the clustered meta-trimaps at step S1530.

In this case, the trimap generation unit 120 clusters the meta-trimaps into a foreground region, a background region, and an unknown region.

In this case, the foreground region refers to a region in which an object of interest is present. The background region refers to a region in which an object of interest is not present. The unknown region refers to a region in which whether an object of interest is present cannot be determined.

In this case, when the meta-trimaps are clustered into the three regions, a graph segmentation method may be used.

In this case, the same value may be assigned to all pixels within each of the clustered regions. For example, the average value of the values of all the pixels may be assigned to pixels within the foreground region.

In this case, the trimap may be formed by integrating the clustered meta-trimaps.

Furthermore, an alpha map is generated based on the trimap, and an object of interest is extracted at step S1540.

In this case, the alpha map refers to data other than the three colors (R, G, and B) processed by a computer. When the color of one pixel is displayed in the state of overlapping the color of another pixel, the alpha map may be used to effectively merge the two colors. In an embodiment of the present invention, the value of a probability of being included in the foreground region versus the background region within the unknown region inside an image is assigned as a transparency value. The alpha map refers to an image showing a transparency value, and a description thereof has been given with reference to FIG. 10.

In this case, the image matting refers to a technology for comparing two or more images, removing a background region from an original image, and displaying only a foreground region. The alpha map generation unit 130 may extract the object of interest based on image matting using the alpha map and the original image.

In this case, the alpha map generation unit 130 may generate the alpha map using a matting Laplacian matrix, into which color distances between all the pixels in the image have been incorporated, and the alpha map.

As described above, according to at least one embodiment of the present invention, an object of interest can be automatically extracted based on the principle that elements within similar regions analyzed from a cognitive perspective have similar saliency map and alpha map values.

Furthermore, according to at least one embodiment of the present invention, an object of interest can be more precisely extracted by probabilistically estimating transparency alpha values between an object of interest and a background using an alpha map.

Furthermore, according to at least one embodiment of the present invention, spatial support for an object inside an image can be provided by precisely extracting an object of interest.

Figure 16:
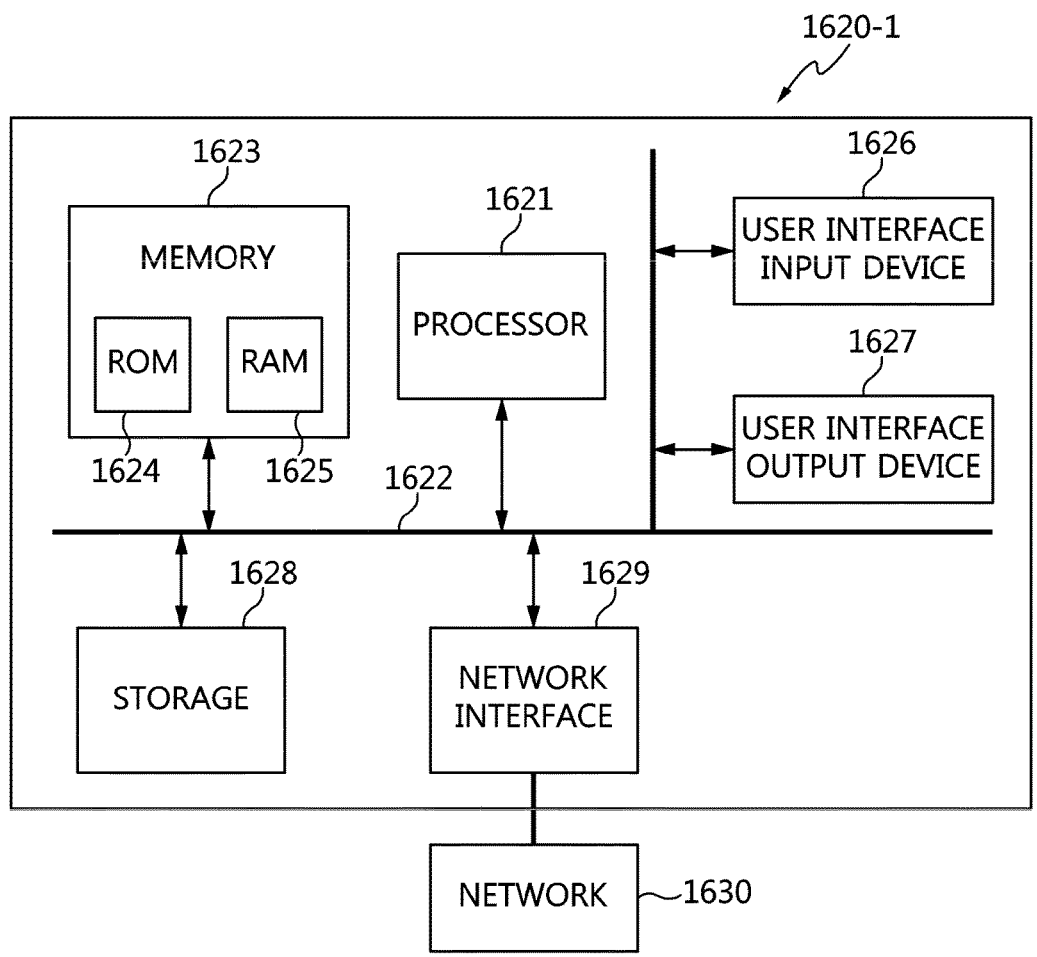
FIG. 16 is an embodiment of the present invention implemented in a computer system.

FIG. 16 is an embodiment of the present invention implemented in a computer system.

Referring to FIG. 16, an embodiment of the present invention may be implemented in a computer system, e.g., as a computer readable medium. As shown in in FIG. 16, a computer system 1620-1 may include one or more of a processor 1621, a memory 1623, a user input device 1626, a user output device 1627, and a storage 1628, each of which communicates through a bus 1622. The computer system 1620-1 may also include a network interface 1629 that is coupled to a network 1630. The processor 1621 may be a central processing unit (CPU) or a semiconductor device that executes processing instructions stored in the memory 1623 and/or the storage 1628. The memory 1623 and the storage 1628 may include various forms of volatile or non-volatile storage media. For example, the memory may include a read-only memory (ROM) 1624 and a random access memory(RAM) 1625.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

As described above, the apparatus and method for extracting an object of interest from an image using image matting based on global contrast according to the present invention are not limited to the configurations and methods of the aforementioned embodiments, but some or all of the embodiments may be selectively combined such that the embodiments are modified in various manners.

What is claimed is:

1. An apparatus for extracting an object of interest from an image using image matting, comprising:
   a saliency map generation unit configured to generate a saliency map corresponding to an object of interest inside an input image using a color space probability distribution corresponding to the input image;
   a trimap generation unit configured to receive the saliency map from the saliency map generation unit and to generate from the saliency map meta-trimaps using filters and to generate a trimap by clustering the meta-trimaps; and
   an alpha map generation unit configured to receive the trimap from the trimap generation unit and to generate an alpha map using the trimap and a matting Laplacian matrix and to extract the object of interest based on image matting using the alpha map and the input image.

2. The apparatus of claim 1, wherein the saliency map generation unit comprises:
   a color segmentation unit configured to perform a Gaussian mixture model (GMM)-based color segmentation on the input image;
   a probability distribution generation unit configured to generate the color space probability distribution based on an image labeled with pixel values corresponding to the input image and based on the GMM-based color segmentation; and a generation unit configured to generate the saliency map using a probability value calculated based on the color space probability distribution and a space variance based on the GMM-based color segmentation.

3. The apparatus of claim 2, wherein the generation unit calculates the space variance using the following equation:

$$\mathrm{Var}(z_{pos}|c) = \frac{1}{|c|_c}\sum_{z} P(c|I_z) \cdot |z_{pos} - M(z_{pos}|c)|^2$$

where $\mathrm{Var}(z_{pos}|c)$ is a space variance, c is a GMM element, $I_z$ is a pixel color, $P(c|I_z)$ is a probability that the pixel color $I_z$ will be included in the GMM element c, $M(z_{pos}|c)$ is a space mean and $z_{pos}$ is a position of pixel z within the GMM element c, z is a pixel, and $\sum_z$ is a total sum of $P(c|I_z) \cdot |z_{pos} - M(z_{pos}|c)|^2$ corresponding to z.

4. The apparatus of claim 1, wherein the trimap generation unit comprises:
a meta-trimap generation unit configured to generate two meta-trimaps from the saliency map using two filters;
a clustering unit configured to cluster the meta-trimaps into a foreground region, a background region, and an unknown region; and
a generation unit configured to generate the trimap by integrating the clustered meta-trimaps.

5. The apparatus of claim 4, wherein the meta-trimap generation unit generates the two meta-trimaps using a Gaussian blur filter and a dilation and erosion filter.

6. The apparatus of claim 4, wherein the clustering unit assigns an identical value to all pixels within a clustered group present in each of the meta-trimaps.

7. The apparatus of claim 6, wherein the clustering unit assigns a color average value of values of all the pixels within the group to all the pixels.

8. The apparatus of claim 1, wherein the alpha map generation unit comprises: a matting Laplacian matrix calculation unit configured to calculate the matting Laplacian matrix into which color distances between all pixels inside the image have been incorporated; a generation unit configured to calculate transparent values of pixels using the matting Laplacian matrix and the trimap and generate the alpha map based on the transparent values; and an object extraction unit configured to extract the object of interest based on the image matting using the alpha map and the image.

9. The apparatus of claim 8, wherein the matting Laplacian matrix calculation unit converts the matting Laplacian matrix into a sparse matrix, and stores the sparse matrix.

10. The apparatus of claim 8, wherein the object extraction unit extracts the object of interest based on a foreground region, a background region, and a linear combination relationship between transparency alpha values corresponding to the alpha map.

11. A method for extracting an object of interest from an image using image matting, comprising:
generating a saliency map corresponding to an object of interest inside an input image using a color space probability distribution corresponding to the input image;

generating meta-trimaps using filters based on the saliency map, and generating a trimap by clustering the meta-trimaps; and generating an alpha map using a matting Laplacian matrix from the trimap, and extracting the object of interest based on image matting using the alpha map and the input image.

12. The method of claim 11, wherein generating the saliency map comprises:
performing Gaussian mixture model (GMM)-based color segmentation on the input image;
generating the color space probability distribution based on an image labeled with pixel values corresponding to the input imageand based on the GMM-based color segmentation; and
generating the saliency map using a probability value calculated based on the color space probability distribution and a space variance based on the GMM-based color segmentation.

13. The method of claim 12, wherein generating the saliency map comprises calculating the space variance using the following equation:

$$\mathrm{Var}(z_{pos}|c) = \frac{1}{|c|_c}\sum_{z} P(c|I_z) \cdot |z_{pos} - M(z_{pos}|c)|^2$$

where $\mathrm{Var}(z_{pos}|c)$ is a space variance, c is a GMM element, $I_z$ is a pixel color, $P(c|I_z)$ is a probability that the pixel color $I_z$ will be included in the GMM element c, $M(z_{pos}|c)$ is a space mean and $z_{pos}$ is a position of pixel z within the GMM element c, z is a pixel, and $\sum_z$ is a total sum of $P(c|I_z) \cdot |z_{pos} - M(z_{pos}|c)|^2$ corresponding to z.

14. The method of claim 11, wherein generating the trimap comprises:
generating two meta-trimaps from the saliency map using two filters;
clustering the meta-trimaps into a foreground region, a background region, and an unknown region; and
generating the trimap by integrating the clustered meta-trimaps.

15. The method of claim 14, wherein generating the meta-trimap comprises generating the two meta-trimaps using a Gaussian blur filter and a dilation and erosion filter.

16. The method of claim 14, wherein clustering the meta-trimaps comprises assigning an identical value to all pixels within a group present in each of the meta-trimaps.

17. The method of claim 16, wherein clustering the meta-trimaps comprises assigning a color average value of values of all the pixels within the group to all the pixels.

18. The method of claim 11, wherein generating the alpha map comprises:
calculating the matting Laplacian matrix into which color distances between all pixels inside the image have been incorporated;
calculating transparent values of pixels using the matting Laplacian matrix and the trimap, and generating the alpha map based on the transparent values; and
extracting the object of interest based on the image matting using the alpha map and the image.

19. The method of claim 18, wherein calculating the matting Laplacian matrix comprises:
converting the matting Laplacian matrix into a sparse matrix, and storing the sparse matrix.

20. The method of claim 18, wherein extracting the object comprises extracting the object of interest based on a foreground region, a background region, and a linear combination relationship between transparency alpha values corresponding to the alpha map.

* * * * *